United States Patent [19]

Gunness

[11] Patent Number: 5,326,071
[45] Date of Patent: Jul. 5, 1994

[54] DRAIN PLUG AND METHOD FOR REMOVING FLUID FROM A TANK USING A DRAIN PLUG

[75] Inventor: Donald B. Gunness, Abercrombie, N. Dak.

[73] Assignee: Donald B. Gunness, Abercrombie, N. Dak.

[21] Appl. No.: 76,139

[22] Filed: Jun. 14, 1993

[51] Int. Cl.⁵ ............................................. F16K 31/44
[52] U.S. Cl. .................................. 251/145; 251/291; 251/339; 137/901
[58] Field of Search ............... 251/145, 291, 144, 339; 137/901; 222/322, 501

[56] References Cited

U.S. PATENT DOCUMENTS

| | | | |
|---|---|---|---|
| 1,839,413 | 1/1932 | Sage | 137/901 X |
| 1,848,767 | 3/1932 | Carter | 137/901 X |
| 2,021,587 | 11/1935 | Agner | 251/291 X |
| 3,143,135 | 8/1964 | Cornelius | 251/145 X |
| 3,727,638 | 4/1971 | Zaremba, Jr. et al. | 137/572 |
| 3,910,550 | 10/1975 | Nelson | 251/144 |
| 3,999,570 | 12/1976 | Clements | 251/145 X |
| 4,361,310 | 11/1982 | Cummins | 251/144 |
| 4,503,934 | 3/1985 | Stephanus et al. | 184/1.5 |
| 4,880,029 | 11/1989 | Koller | 251/291 X |
| 4,951,723 | 8/1990 | Hoeptner, III | 141/351 |
| 5,086,522 | 2/1992 | Stofko, Sr. | 251/264 X |

Primary Examiner—A. Michael Chambers
Assistant Examiner—Kevin L. Lee
Attorney, Agent, or Firm—Foley & Lardner

[57] ABSTRACT

A drain plug comprising a housing including a body portion, a head portion and a first passage extending through the head portion and into the body portion; a valve seat disposed in the first passage; a movable valve closure member disposed in the first passage; a biasing device, disposed in the first passage, for biasing the valve closure member against the valve seat thereby sealing off the first passage such that fluid cannot pass through the first passage; a moving device for moving the valve closure member away from the valve seat to allow fluid to pass through the first passage, the moving device being positioned transverse to the longitudinal length of the first passage.

8 Claims, 3 Drawing Sheets

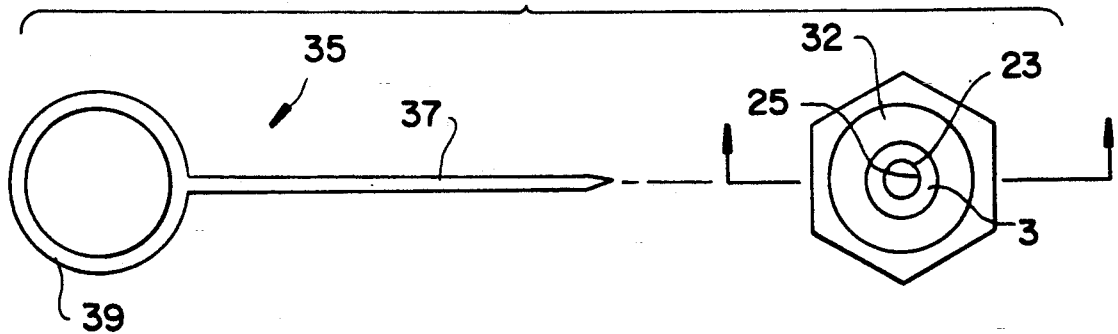
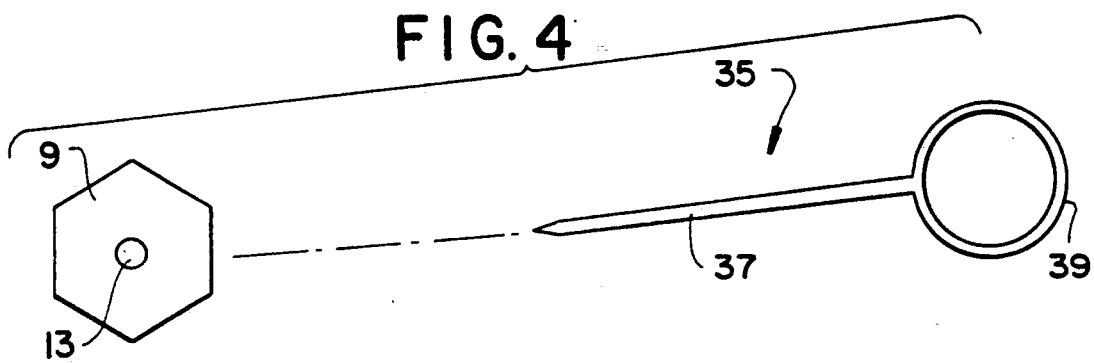
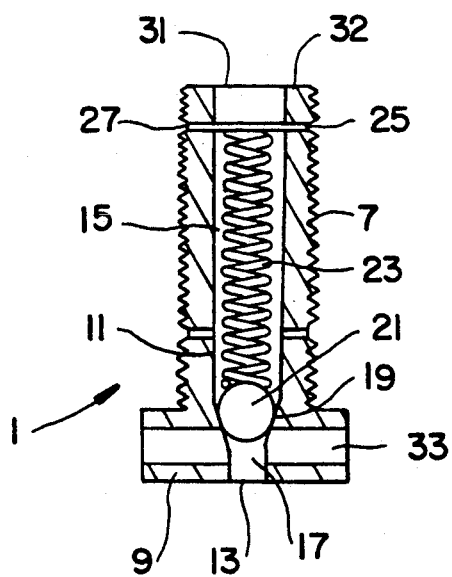

DRAIN PLUG AND METHOD FOR REMOVING FLUID FROM A TANK USING A DRAIN PLUG

BACKGROUND OF THE INVENTION

1. Field of the Invention

This invention relates to a drain plug, and more particularly to a drain plug which is adapted for use as a draining device for removing fluid from a tank. The invention also relates to a method for removing fluid from a tank which uses the drain plug.

b 2. Description of the Related Art

Drain plugs are used in conjunction with a number of different types of fluid holding receptacles, such as engine crankcases, in order to provide a convenient method for removing the fluid contained in the holding receptacle, when required. Conventional drain plugs are typically bolts having a threaded shaft portion and a head portion, which are screwed into a threaded opening in a wall of the fluid holding receptacle. The bolt is tightened via the head until a washer is clamped between the head portion and the wall of the tank, thereby sealing the threaded opening in the tank. When the fluid in the tank needs to be removed, the plug is unscrewed so that the fluid runs from the tank due to gravity.

However, a major disadvantage of the above-described conventional plugs is that as the plug is unscrewed, the fluid typically rushes out of the tank and onto the tool which is being used for unscrewing the bolt, as well as onto the tool operator's hands. This not only results in a great deal of fluid spillage, but can also burn the operator if the fluid being removed is hot, which is often the case.

Furthermore, since the drain plug itself often becomes slippery and hot due to the exiting fluid, the drain plug is often dropped, whereby it is lost or damaged.

Finally, since the drain plug must be screwed and unscrewed each time the fluid is removed, there is an increased chance that cross-threading can take place, which can lead to the destruction of the drain plug threads and the corresponding drain hole threads.

A number of drain plugs have been designed to overcome some the above-mentioned problems. However, many of these conventional plugs have different physical outer dimensions as compared to the original drain plug which they are designed to replace. The increased physical dimensions precludes the use of these plugs in specific close quarter applications.

U.S. Pat. No. 4,951,723 discloses a drain plug consisting of a head, a body, and a bore extending completely through the head and into the body. A spring and a plunger are disposed within the bore such that the spring biases the plunger past ports or openings in the body which are designed to allow fluid from a tank to pass therethrough. However, in order to prevent the fluid from running out of the tank between the plunger and the inner walls of the bore, O-ring seals are provided in the head, thereby containing the fluid between the inner walls of the bore and the plunger. When fluid is to be removed from the tank, a separate plug is forcibly inserted into the bore via the head portion of the drain plug such that it pushes the plunger against the force of the spring. The plunger is moved against the spring force until the ports or openings are no longer covered by the plunger. Fluid from the tank then enters through the ports and flows out of the tank via a central bore in the separate plug while the O-rings prevent fluid from escaping between the inner wall of the bore and the outer wall of the separate plug.

A major disadvantage of U.S. Pat. No. 4,951,723 resides in the fact that the O-ring seals are subject to cracking and erosion due to the constant abrasion between the O-ring seals and the separate plug and the plunger. Thus, replacement of the drain plug is ultimately required.

SUMMARY OF THE INVENTION

It is an object of the invention to provide a drain plug which is simple in design and which has the same physical external dimensions as any drain plug which it is designed to replaced.

It is also an object of the invention to provide a drain plug which does not have to be unscrewed in order to remove fluid from a tank, and which is simple to use.

Yet another object of the invention is to provide a drain plug which allows fluid to be removed from a tank without spilling the fluid, damaging the drain plug, or harming the user.

Still another object of the invention is to provide a drain plug which minimizes cross-threading from occurring between the drain plug threads and the threaded drain hole in which it is received.

The above objects are met by providing a drain plug having a housing including a body portion, a head portion, and a first passage extending through the head portion and into the body portion; a valve seat disposed in the first passage; a movable valve closure member disposed in the first passage; biasing means, disposed in said first passage, for biasing the valve closure member against the valve seat thereby sealing off the first passage such that fluid cannot pass through the first passage; means for moving the valve closure member away from the valve seat to allow fluid to pass through the first passage, the moving means being positioned transverse to the longitudinal length of the first passage.

Still another object of the invention is to provide a method for removing fluid from a tank, the method including A) inserting a drain plug into a tank, the drain plug having a body, a head, a bore extending through the head and into the body, a valve seat disposed in the bore, a movable check ball disposed in the bore, and a spring biasing the check ball against the valve seat which prevents fluid from leaving the tank via the bore; B) allowing fluid from the tank to flow into the 10 bore; and C) moving the check ball away from the valve seat to allow fluid to flow from the tank to the exterior of the tank via the bore.

BRIEF DESCRIPTION OF THE DRAWINGS

Other objects, features and advantages of the present invention will become apparent from the following detailed description and accompanying drawings wherein:

FIG. 3 is a top plan view of FIG. 1 showing a relief pin in a removed position, FIG. 4 is a bottom plan view of FIG. 1 showing a relief pin in a removed position, FIG. 5 is a sectional view taken along line III—III of FIG. 3.

DETAILED DESCRIPTION OF THE PREFERRED EMBODIMENTS

Figure 1:
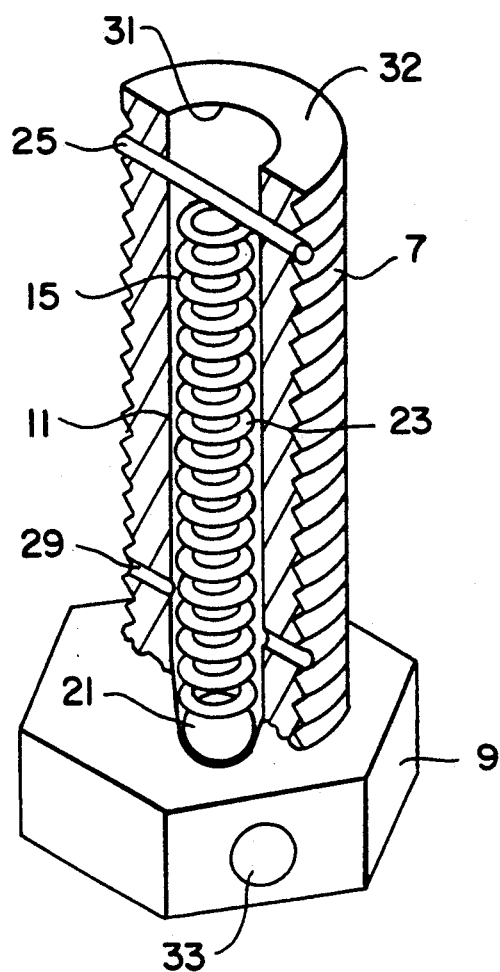
FIG. 1 is a partially cut-away perspective view showing a drain plug according to the invention.
Figure 2:
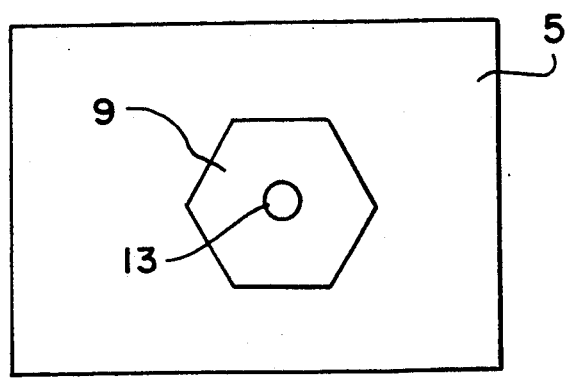
FIG. 2 is a bottom plan view showing the drain plug of FIG. 1 mounted in a tank wall.
Figure 6:
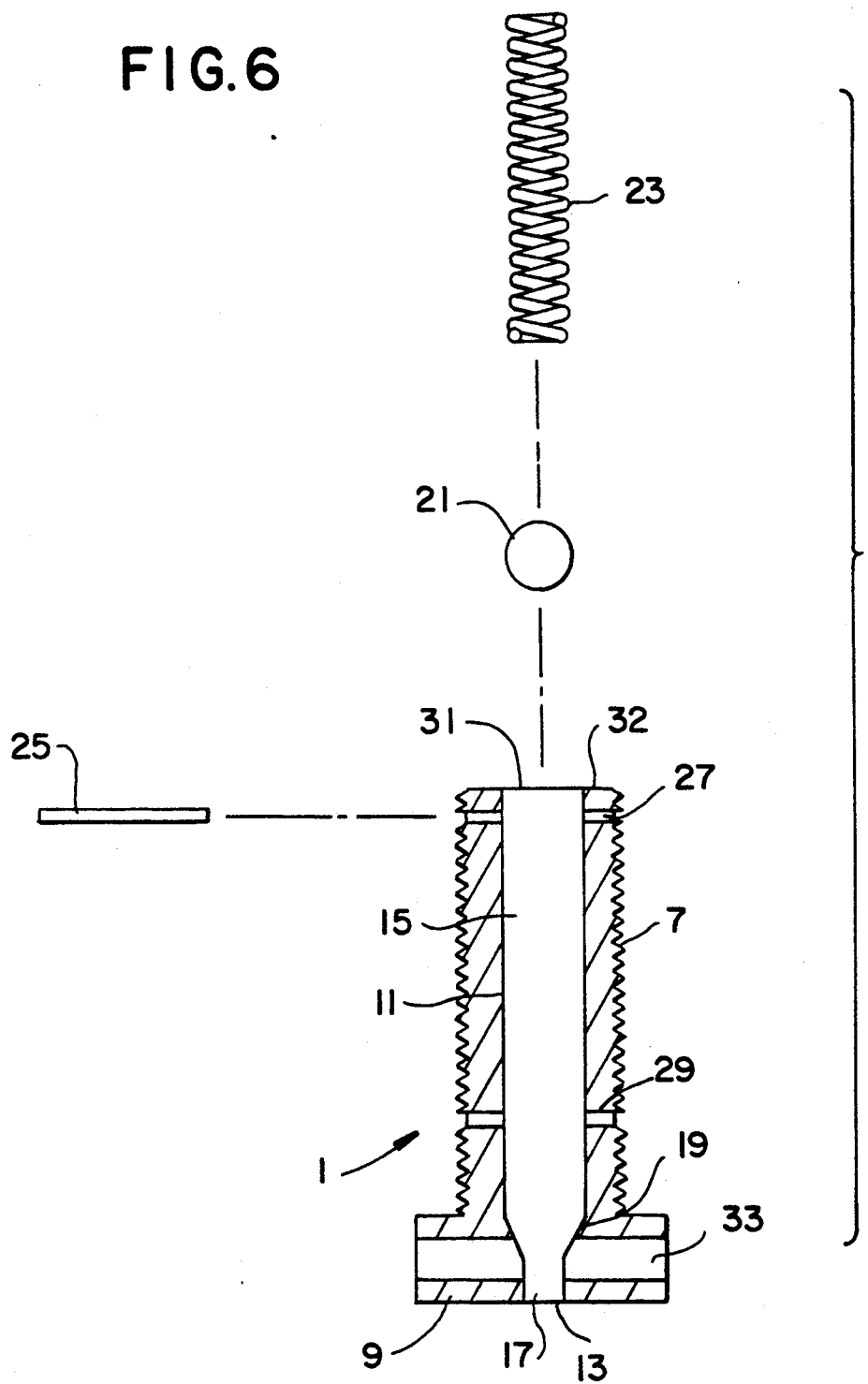
FIG. 6 is an exploded view of the drain plug of FIG. 1 with a portion thereof shown in cross-section.

FIGS. 1-6 show a drain plug 1 which is used to seal an opening (not shown) in a tank 5, as reflected in FIG. 2. Drain plug 1 includes threaded body 7 which engages corresponding threads (not shown) in the opening of the tank 5, and a head portion 9 integrally formed with threaded body 7. A first passage 11 extends completely through threaded body 7 and head portion 9 such that a fluid passage is created through which fluid (not shown) in tank 5 can pass to the outside of tank 5, via mouth 13 in head portion 9.

The first passage 11 includes a first bore 15 extending through threaded body 7, a second bore 17 extending from mouth 13 into head portion 9, and a transition portion 19 connecting first bore 15 to second bore 17. Transition portion 19 has a cone-shaped configuration and serves as a valve seat for a check ball 21.

Check ball 21 is biased against valve seat 19 by a spring 23 such that the engagement of check ball 21 and valve seat 19 prevents fluid from exiting tank 5 via first passage 11. Spring 23 is retained in place by retaining pin 25 which is itself retained in opening 27 due to the force exerted thereon by spring 23. Moreover, other conventional means of retaining the retaining pin 25 in opening 27 can be used in conjunction with the force exerted by spring 23.

Threaded body 7 also includes a drain hole 29 which permits fluid within tank 5 to flow into the first bore 15 such that when, as described below, check ball 21 is moved away from valve seat 19, the fluid from tank 5 will be removed to the outside of tank 5 via mouth 13. In addition, fluid in tank 5 similarly flows through the first bore 15 via mouth 31 in end portion 32 of threaded body 7. That is, first bore 15 extends completely through end portion 27 thereby forming mouth 31 in end portion 32 such that fluid from tank 5 may enter via mouth 31 directly into first bore 15. Thus, when the level of fluid in tank 5 is above end portion 32, the fluid is received in first bore 15 via mouth 31 and drain hole 29. However, when the level of fluid in the tank drops below end portion 32, the fluid only flows from the tank 5 into the first bore 15 via drain hole 29. This structure allows for a thorough draining of tank 5.

It is important to note that the first bore 15 does not have to extend through end portion 32 but can stop short thereof, since the drain hole 29 permits passage of the fluid in tank 5 into first bore 15. Moreover, a plurality of drain holes 29 could be included.

Head portion 9 has a passage 33 extending completely therethrough. Passage 33 is transverse to first passage 11. That is, passage 33 crosses and intersects passage 11 such that they are in communication with each other. Passage 33 is designed to receive a member 35 therein, which in the preferred embodiment is shown as a relief pin 35 having a shaft 37 and ring portion 39. However, member 35 can be any configuration which allows it to be inserted into passage 33.

In operation, drain plug 1 is used to both seal the opening in tank 5 such that no fluid is removed from tank 5, and to remove fluid from tank 5. As previously discussed, spring 23 forces check ball 21 against valve seat 19 thereby preventing any fluid which enters into first bore 15 from exiting via mouth 13. However, upon insertion of shaft 37 of relief pin 35 into passage 33, shaft 37 contacts and raises check ball 21 away from valve seat 19, thereby allowing fluid in first bore 15 to flow around check ball 21 and out mouth 13 via valve seat 19 and second bore 17. As long as relief pin 35 remains in passage 33, fluid will continually flow from tank 5 into first bore 15 and out mouth 13 as previously described. However, when relief pin 35 is removed from passage 33, the biasing force of spring 23 will reseat check ball 21 on valve seat 19 thereby preventing the flow of fluid from tank 5 to the outside of tank 5 via the drain plug 1.

The above described embodiment can be used in conjunction with any tank or receptacle containing fluid therein. Common examples of such tanks are crankcases, gearboxes, and radiators. Moreover, while a spring 23 has been disclosed, any device or elastomeric material capable of exerting a biasing force can be used in lieu thereof.

Furthermore, the valve seat 19 which is integrally formed as part of the passageway 11, can be a separate member disposed in passageway 11 upon which the check ball 21 rests. In that regard, the check ball 21 can be any type of valve closure member which can be used to seal against the valve seat 19. Thus, the valve closure member design is not restricted to the spherical ball shown in the drawings.

Additionally, the passage 33 need not extend completely through the head portion 9, but only needs to extend into the head portion 9 far enough to allow the release pin 35 to engage and lift the check ball 21. The passage 33 can be many different shapes other than the circular bore shown. The shape of the passage 33 only needs to be able to receive the release pin 35, and could for example, be cone-shaped, rectangular, and inclined relative to the horizontal plane.

Other objects, features and advantages of the present invention will become apparent to those skilled in the art. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A drain plug comprising:
   a housing including a body portion, a head portion and a first passage extending through said head portion and into said body portion;
   a valve seat disposed in said first passage;
   a movable check ball disposed in said first passage;
   a spring, disposed in said first passage, for biasing said check ball against said valve seat thereby sealing off said first passage such that fluid cannot pass through said first passage; and
   means for moving said valve closure member away from said valve seat to allow fluid to pass through said first passage, said moving means being positioned transverse to the longitudinal length of said first passage;
   wherein said moving means includes a second passage in said head portion which is in communication with said first passage;
   wherein said first passage includes a first bore and a second bore which is smaller in diameter than said first bore, and said valve seat connects said first bore to said second bore;
   wherein said valve seat and said moving means are located in said head portion, said valve seat is a cone-shaped portion of said first passage, at a largest diameter part of said cone-shaped portion the inner surface of said cone-shaped portion is contiguous with the inner surface of said first bore, and at a smallest diameter part of said cone-shaped portion the inner surface of said cone-shaped portion is contiguous with the inner surface of said second bore; and wherein said moving means further includes a first pin which is removably received in said second passage such that when said first pin is received in said second passage, said first pin moves said check ball away from said valve seat.

2. A drain plug as recited in claim 1, further comprising a third passage in said body portion and a second pin which is removably received in said third passage, wherein when said second in is received in said third passage, said spring is retained in said first passage.

3. A drain plug as recited in claim 2, further comprising means for communicating a portion of said first passage located in said body portion with the outside of said housing.

4. A drain plug as recited in claim 3, wherein said communicating means includes at least one opening in said body portion which connects said portion of said first passage with the outside environment.

5. A drain plug, comprising:
a bolt having a head portion, a shaft portion, and a bore extending through said head and shaft portions, said bore defining a fluid passage;
a valve seat disposed in said bore;
a check ball movably disposed in said bore;
biasing means, disposed in said bore, for biasing said check ball against said valve seat thereby preventing a flow of fluid through said fluid passage; and
means for moving said check ball away from said valve seat such that fluid can flow through said fluid passage, said moving means including a passageway which extends into said head portion transversely with respect to said fluid passage and a member which is removably received in said passageway such that when said member is received in said passageway it moves said check ball away from said valve seat.

6. A drain plug as recited in claim 5, wherein said biasing means is a spring.

7. A drain plug as recited in claim 6, wherein said valve seat is integrally formed as part of said bore.

8. A method for removing fluid from a tank, the method comprising the steps of:
A) inserting a drain plug into said tank, said drain plug a body, a head having a passage therein, a bore extending through said head transverse to said passage and into said body, a valve seat disposed in said bore, a movable check ball disposed in said bore, and a spring biasing said check ball against said valve seat which prevents fluid from leaving said tank via said bore;
B) allowing fluid from said tank to flow into said bore; and
C) inserting a member into said passage to move said check ball away from said valve seat to allow fluid to flow from said tank to the exterior of said tank via said bore.

* * * * *